June 11, 1935.  H. R. MASSINGHAM  2,004,612
CABLE AND METHOD OF MAKING SAME
Filed Sept. 14, 1933
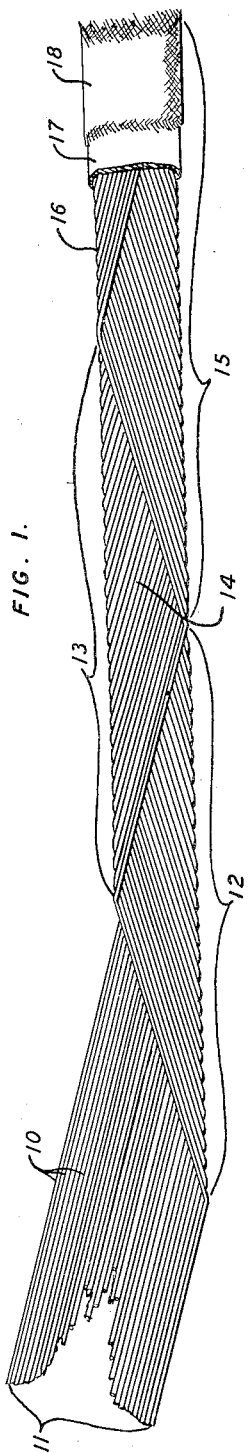
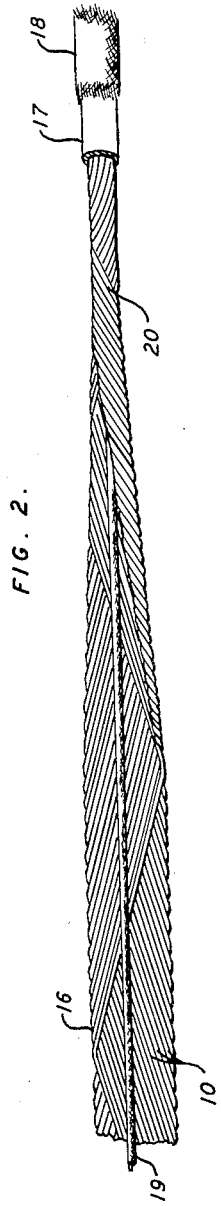
INVENTOR
H. R. MASSINGHAM
BY E. R. Nowlan
ATTORNEY Patented June 11, 1935

2,004,612

UNITED STATES PATENT OFFICE 2,004,612

CABLE AND METHOD OF MAKING SAME

Henry R. Massingham, Westfield, N. J., assignor to Western Electric Company, Incorporated, New York, N. Y., a corporation of New York Application September 14, 1933, Serial No. 689,377

15 Claims. (Cl. 173—13)

This invention relates to cables and a method of making the same, and more particularly to a method of making such cables which produces at one stage of the operation thereof a flat, coreless non-self-inductive multi-conductor cable such as is often used in telephone switchboards, and when carried on to a further stage produces a round or oval cable peculiarly adapted to high frequency apparatus such as inductometers.

In telephone switchboards, the enormous number of conductors used makes every saving of space occupied by conductor cables of great practical importance. In some parts of such switchboards the conductors are often assembled into cables having a broad, thin, flat cross section. In other parts where many conductor cables are piled and supported on each other it is preferred to have the cables oval in cross section rather than round.

In various kinds of high frequency apparatus it may be of importance that a plurality of conductors be so interwoven or intertwined that each individual conductor strand shall appear at symmetrically recurrent points of the assembly of strands and that each conductor strand shall maintain a recurrent definite positional relation to every other.

An object of the present invention is to produce flat conductor cables having a minimum cross sectional area, in which the strands are assembled into such a cable without need for using the core hitherto customary.

Another object of the invention is to produce an oval or round cable in which the structure ensures that each strand of the cable shall maintain a recurrent definite positional relation to every other, and which may or may not be assembled with a core, either conductive or non-conductive in nature.

With these and other objects in view, one mode of practicing the invention contemplates a method of making a flat cable by arranging a flat band of parallel strands, which band, as a whole, is folded diagonally alternately to and fro. The flat assembly of angularly waved conductors thus formed may then be provided with paper and foil wrappings if desired, and a textile outer covering may be braided thereover, thus producing a coreless flat non-self-inductive multi-conductor cable peculiarly adapted for telephone switchboards.

On the other hand, the flat assembly of angularly waved conductors produced by the first part of the process may be rolled on a longitudinal axis, by means of a mandrel and appropriate die or rolls, or otherwise, for example, into a round or oval cable in which the definite predetermined recurrently varying relation of each individual conductor to each of the others is rigorously preserved. This step of the process may or may not include the provision of a core around which the waved conductors are rolled. The assembly thus formed may then be provided with one or more binding or protective or other sheaths, as may be desired.

Other objects and features of the invention will appear from the following detailed description of one mode of practicing the invention taken in connection with the accompanying drawing, in which identical reference numerals are applied to the same parts in the several figures, and in which Fig. 1 is a diagrammatic view of a plurality of conductor strands showing the results of various steps in the process as applied to the production of a flat cable, and Fig. 2 is a similar view relative to the production of a round or oval cable.

In practicing the invention as herein disclosed, a plurality of preferably insulated conductor strands 10 is arranged so that the strands lie parallel to each other and substantially in one plane as shown at 11 in Fig. 1. Ordinarily, each strand will be in contact with its neighbors, although for some purposes it may be preferred to space them apart. At a given position 12 a straight edge may be laid across the group of strands at a predetermined angle and the right hand ends of all the strands bent or crimped forward and upward simultaneously, while maintaining their relative parallelism and co-planarity, as shown at 12. The straight edge may then be applied in the position shown at 13 and the flat group of strands is bent or crimped sharply backward and downward into the position 14. The straight edge is then applied at 15 and the group of strands bent forward and upward. Continuous repetition of the last two bendings described, in turn, will produce the flat assembly of angularly waved conductors, shown at 16, in which each strand has a definite recurrently varying positional relation to every other strand, which changes cyclically with progress along the assembly.

Preferably, the alternate bendings of the group of strands are in oposite direction, forward and back as described, since this disposition diminishes the self induction of the strands in the completed assembly. However, if desired, these bendings may all be made in either direction.

The assembly thus formed is then provided in well known fashion with whatever binding, protective, insulating or other sheaths or coverings, 17, 18 etc., may be desired, to make an unusually thin, flat, coreless cable. An added advantage of such a cable is its unusual flexibility across its major transverse dimension.

Fig. 2 discloses a method of further operating upon the flat assembly 16 of waved strands 10 to produce a round or oval assembly 20 in which the same rigorously maintained cyclically varying positional relation between the strands is present.

In this case, the flat assembly 16 is produced as before and is then rolled around a longitudinal axis to form the assembly shown at 20 which may be either oval or round in cross section, as desired. A core 19 may be provided if desired, and this core may be either conductive or nonconductive as desired. The completed assembly may be further provided with one or more sheathings or covers 17, 18 etc.

As herein disclosed the group of strands from which the cable is formed is shown as having its component strands arranged in parallel, coplanar relationship previous to being bent. This, for most purposes, is the preferred method, but in some instances it may be preferable to impose transpositions, cyclic or other, upon the strands before the recurrent bendings characteristic of the method are imposed.

The procedure has been described as manually performed in the novel steps which produce the flat assembly 16 since the tools or machines which may be utilized to perform the steps form no part of the present invention which relates solely to the method and its product.

It is to be noted that in the preferred form of the invention the flat band of conductor strands is bent or folded to and fro so that the completed flat cable consists of strands which are angularly waved back and forth but do not form a quasi-spiral. It is intended in the appended claims that the phrases "folding to and fro" and "folded to and fro" are to mean precisely this preferred method and structure as clearly disclosed above and in Fig. 1, and as contrasted with a structure in which a conductor is wound in continuous or repeated uni-directional bending or folding into a spiral.

The disclosure of the invention herein is illustrative merely and may be modified and departed from in many ways, without departing from the spirit and scope of the invention as pointed out in and limited solely by the appended claims.

What is claimed is:

1. A method of making a non-self-inductive cable, which comprises the step of folding a group of strands to and fro into recurrent waves.

2. A method of making a non-self-inductive cable, which comprises steps of arranging a plurality of strands into parallel coplanar relation in a flat band, and then folding the band diagonally to and fro.

3. A method of making a non-self-inductive cable, which comprises steps of arranging a plurality of strands into parallel coplanar relation in a flat band, and then folding the band diagonally to and fro to form recurrent angular waves in the strands.

4. A method of making a cable, which comprises steps of arranging a plurality of strands into parallel coplanar relation in a flat band, then folding the band diagonally, and then rolling the assembly longitudinally.

5. A method of making a cable, which comprises steps of arranging a plurality of strands into parallel coplanar relation in a flat band, then folding the band diagonally to and fro, and then rolling the assembly longitudinally.

6. A method of making a cable, which comprises steps of arranging a plurality of strands into parallel coplanar relation in a flat band, then folding the band diagonally to and fro to form recurrent angular waves in the strands, and then rolling the assembly longitudinally.

7. A multi-conductor non-self-inductive cable in which a group of conductors is folded to and fro into angular waves.

8. A multi-conductor non-self-inductive cable in which a group of mutually parallel and coplanar conductors is folded to and fro into angular waves.

9. A method of making a cable, which comprises steps of arranging a plurality of strands into parallel coplanar relation in a flat band, then folding the band diagonally, and then rolling the assembly longitudinally around a core strand.

10. A method of making a cable, which comprises steps of arranging a plurality of strands into parallel coplanar relation in a flat band, then folding the band diagonally to and fro, and then rolling the assembly longitudinally around a core strand.

11. A method of making a cable, which comprises steps of arranging a plurality of strands into parallel coplanar relation in a flat band, then folding the band diagonally to and fro to form recurrent angular waves in the strands, and then rolling the assembly longitudinally around a core strand.

12. A multi-conductor non-self-inductive cable in which a group of conductors is folded to and fro into angular waves and the waved group is folded longitudinally.

13. A multi-conductor non-self-inductive cable in which a group of mutually parallel and coplanar conductors is folded to and fro into angular waves and the waved group is folded longitudinally.

14. A multi-conductor non-self-inductive cable in which a group of conductors is folded to and fro into angular waves and the waved group is folded longitudinally about a central core strand.

15. A multi-conductor non-self-inductive cable in which a group of mutually parallel and coplanar conductors is folded to and fro into angular waves and the waved group is folded longitudinally about a central core strand.

HENRY R. MASSINGHAM.